United States Patent
Brown

(10) Patent No.: US 11,905,865 B2
(45) Date of Patent: *Feb. 20, 2024

(54) OIL CHANGE CAP AND SYSTEM

(71) Applicant: Jed H. Brown, Omaha, NE (US)

(72) Inventor: Jed H. Brown, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,959

(22) Filed: Nov. 14, 2022

(65) Prior Publication Data

US 2023/0279795 A1 Sep. 7, 2023

Related U.S. Application Data

(63) Continuation of application No. 17/242,706, filed on Apr. 28, 2021, now Pat. No. 11,499,453.

(51) Int. Cl.
*F01M 11/04* (2006.01)
*F16N 31/00* (2006.01)

(52) U.S. Cl.
CPC ....... *F01M 11/0458* (2013.01); *F16N 31/004* (2013.01); *F01M 2011/0483* (2013.01); *F01M 2011/0491* (2013.01); *F16N 2031/008* (2013.01)

(58) Field of Classification Search
CPC ....... F01M 11/0458; F01M 2011/0483; F01M 2011/0491; F16N 31/004; F16N 2031/008
See application file for complete search history.

(56) References Cited

U.S. PATENT DOCUMENTS

| 4,756,349 A | 7/1988 | Atkins |
| 2009/0151184 A1 | 6/2009 | Impellizeri |

FOREIGN PATENT DOCUMENTS

| CA | 2168674 A | * | 8/1997 | ............. F16N 19/00 |
| CA | 2168674 A1 | | 8/1997 | |
| JP | 2003097241 A | | 4/2003 | |
| WO | 2006051284 A2 | | 5/2006 | |
| WO | 2019017881 A1 | | 1/2019 | |

* cited by examiner

*Primary Examiner* — Jacob M Amick
*Assistant Examiner* — Charles J Brauch
(74) *Attorney, Agent, or Firm* — Ryan T. Grace; Advent, LLP

(57) ABSTRACT

An oil change cap and system are described. A removable oil cap kit includes a removable oil cap and an oil retention bag. The removable oil cap incudes a sidewall and an interior surface, the interior surface has an opening extending therethrough. The sidewall includes an inner portion and an outer portion. The outer portion of the sidewall includes a channel formed therein for retaining an oil retention bag. The inner portion of the sidewall includes one or more protrusions to couple the removable oil cap with the oil receptacle of a motor.

17 Claims, 9 Drawing Sheets

US 11,905,865 B2

OIL CHANGE CAP AND SYSTEM

BACKGROUND

Oil caps are primarily used for sealing an oil reservoir of a motor. Oil caps are removable to facilitate oil changes and addition of oil to the oil reservoir.

SUMMARY

In an aspect, a removable oil cap kit includes a removable oil cap, a removable dipstick, and an oil retention bag. The removable oil cap incudes a sidewall and an interior surface, the interior surface having an opening extending therethrough. The sidewall includes an inner portion and an outer portion. The outer portion of the sidewall includes a channel formed around a circumference of the outer portion. The inner portion of the sidewall includes one or more protrusions to couple the removable oil cap with the oil receptacle of a motor. The oil retention bag has a lip and is configured to engage the channel around the circumference of the sidewall of the removable oil cap.

In another aspect, the removable oil cap includes an upper wall having an opening extending through the upper wall. The removable oil cap includes a sidewall having an inner portion and an outer portion. The outer portion includes a retainer formed for maintaining a lip of an oil retention bag. The inner portion is configured for coupling with an oil receptacle of a motor.

In another aspect, a removable oil cap system is comprised of a removable oil cap and a removable dipstick. The removable oil cap includes a sidewall having an inner portion and an outer portion. The outer portion has a channel formed therein for retaining a lip of an oil retention bag. The inner portion includes one or more protrusions for coupling with an oil receptacle of a motor. The removable oil cap has an interior surface having an opening extending therethrough. The removable dipstick is configured to extend through the opening of the interior surface and into the oil receptacle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

FIGURES

The Detailed Description is described with reference to the accompanying figures. The use of the same reference numbers in different instances in the description and the figures may indicate similar or identical items.

DETAILED DESCRIPTION

Figure 1:
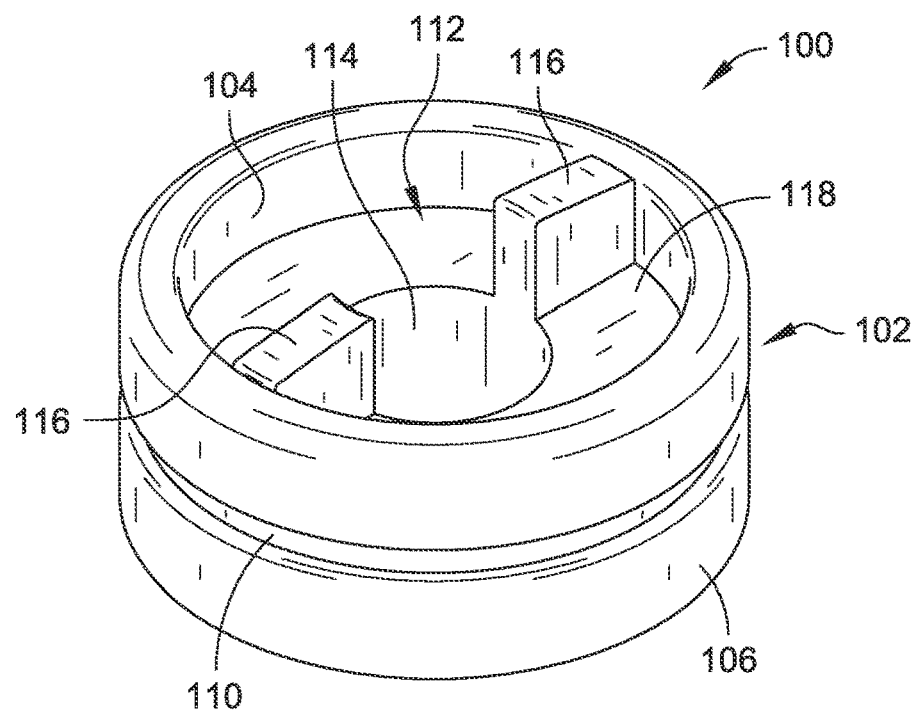
FIG. 1 is a top isometric view of a removable oil cap in accordance with embodiments of the present disclosure.
Figure 2:
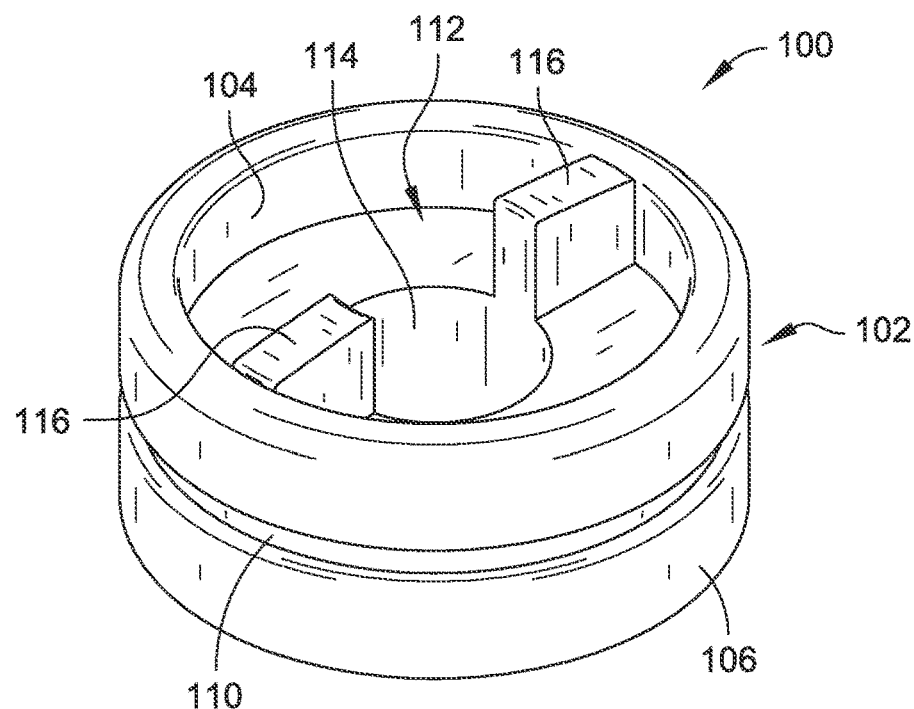
FIG. 2 is another top isometric view of a removable oil cap in accordance with embodiments of the present disclosure.
Figure 3:
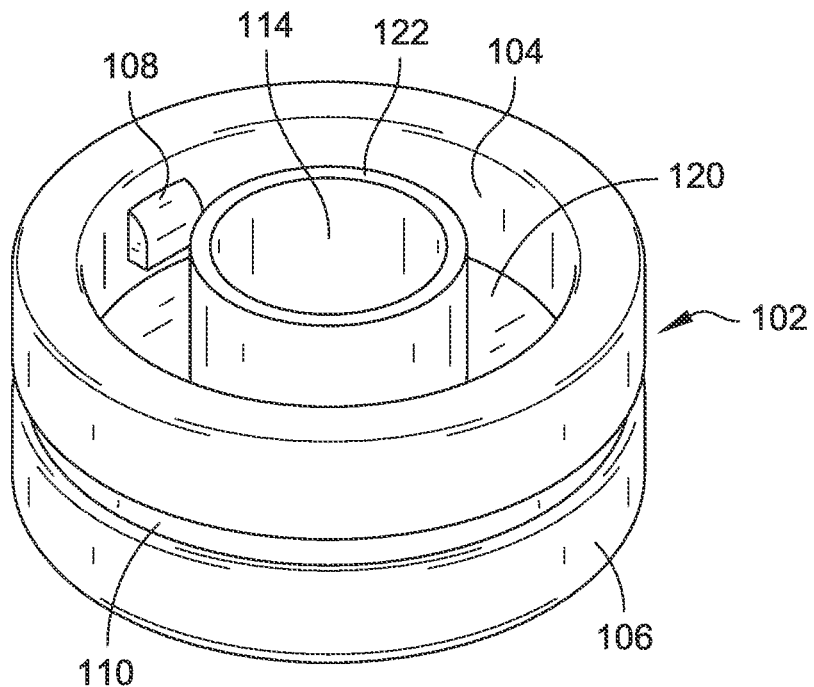
FIG. 3 is a bottom isometric view of a removable oil cap in accordance with embodiments of the present disclosure.
Figure 4:
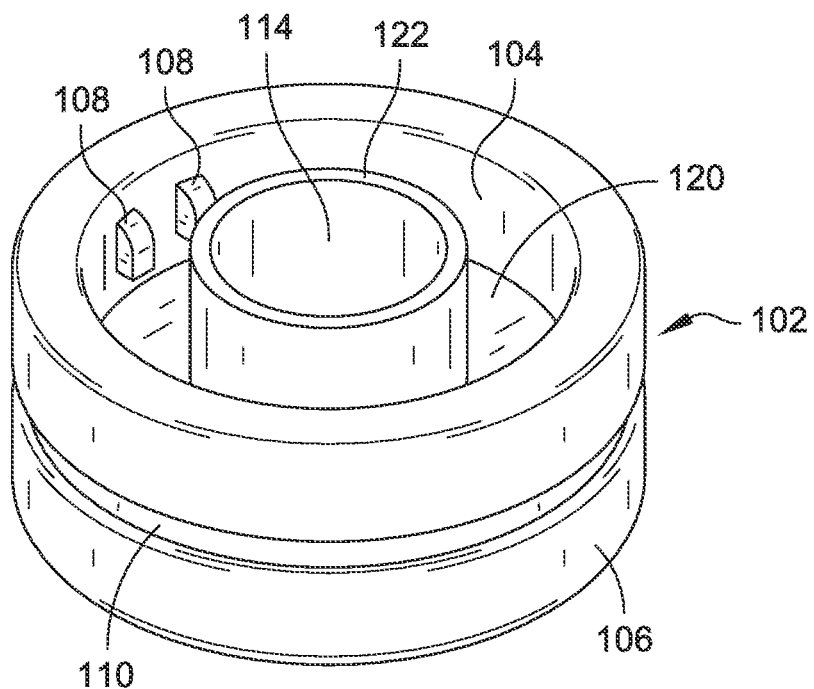
FIG. 4 is another bottom isometric view of a removable oil cap in accordance with embodiments of the present disclosure.
Figure 5:
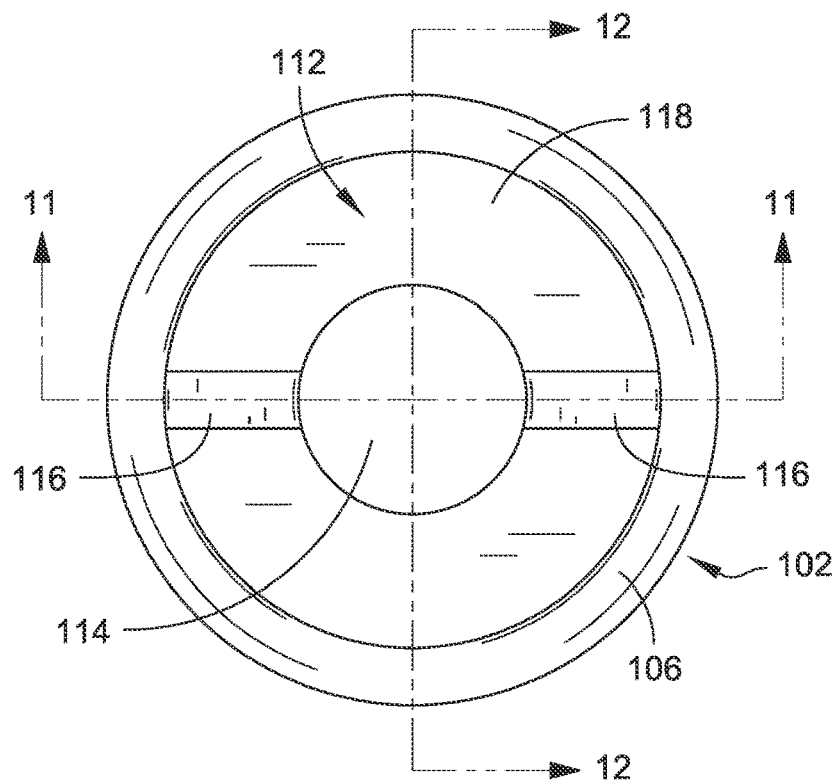
FIG. 5 is a top view of a removable oil cap in accordance with embodiments of the present disclosure.
Figure 6:
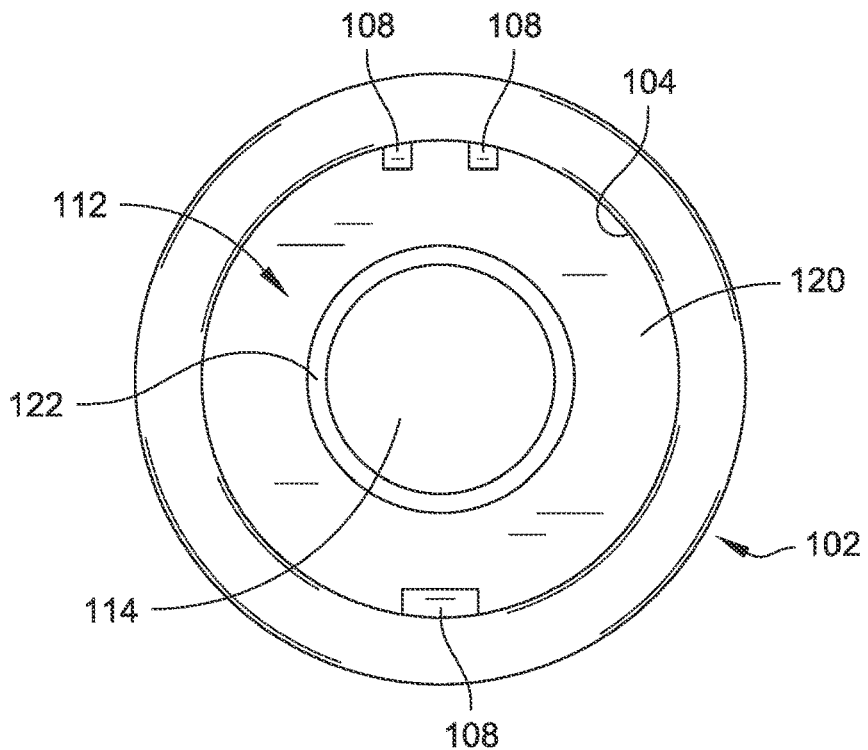
FIG. 6 is a bottom view of a removable oil cap in accordance with embodiments of the present disclosure.
Figure 7:
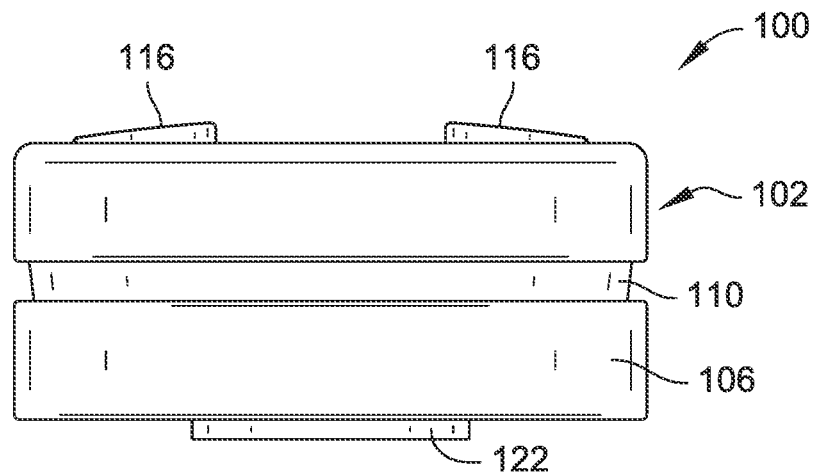
FIG. 7 is a front view of a removable oil cap in accordance with embodiments of the present disclosure.
Figure 8:
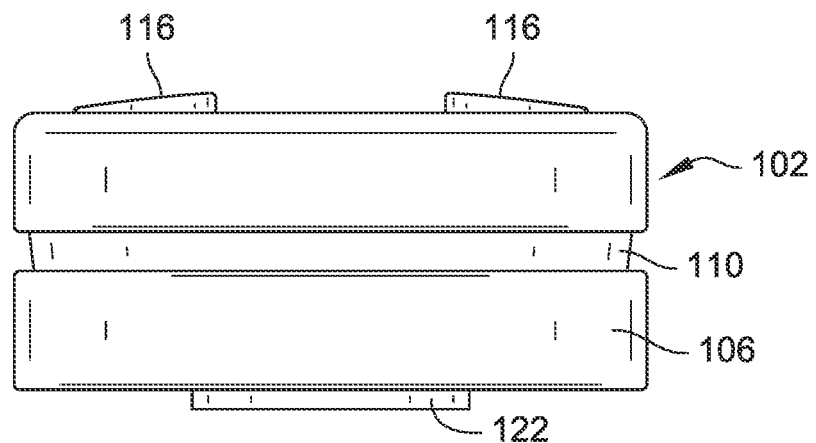
FIG. 8 is a back view of a removable oil cap in accordance with embodiments of the present disclosure.
Figure 9:
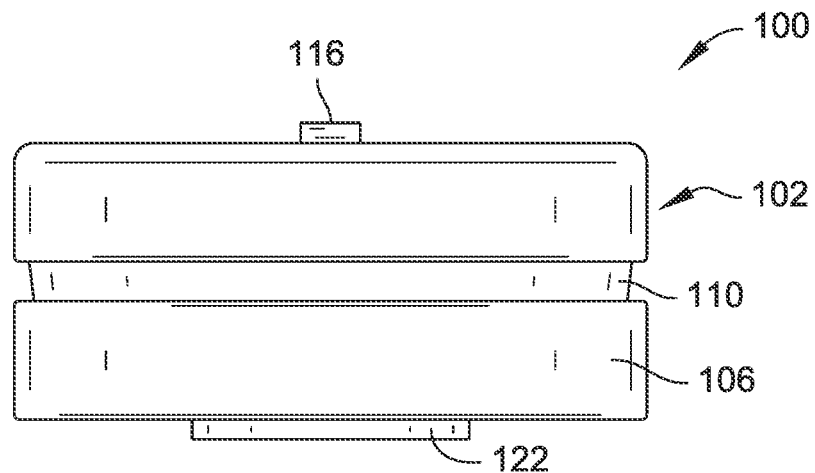
FIG. 9 is a left-side view of a removable oil cap in accordance with embodiments of the present disclosure.
Figure 10:
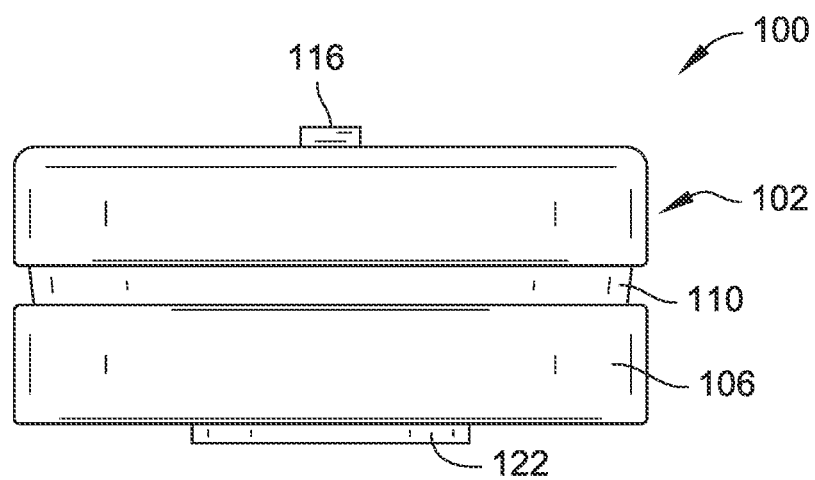
FIG. 10 is a right-side view of a removable oil cap in accordance with embodiments of the present disclosure.
Figure 11:
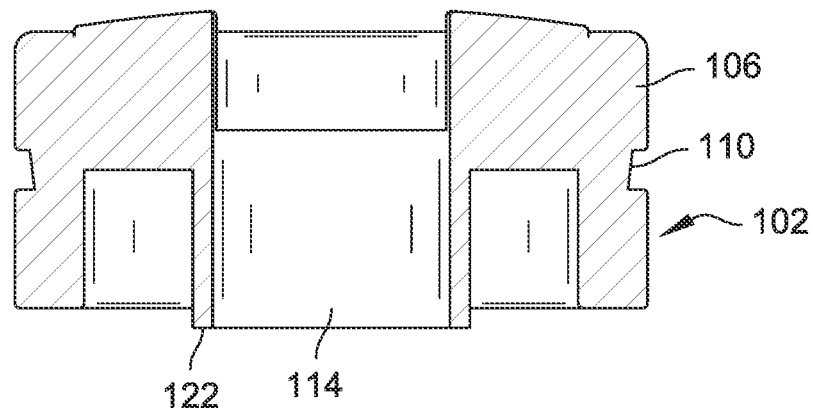
FIG. 11 is a cross-sectional view of a removable oil cap in accordance with embodiments of the present disclosure.
Figure 12:
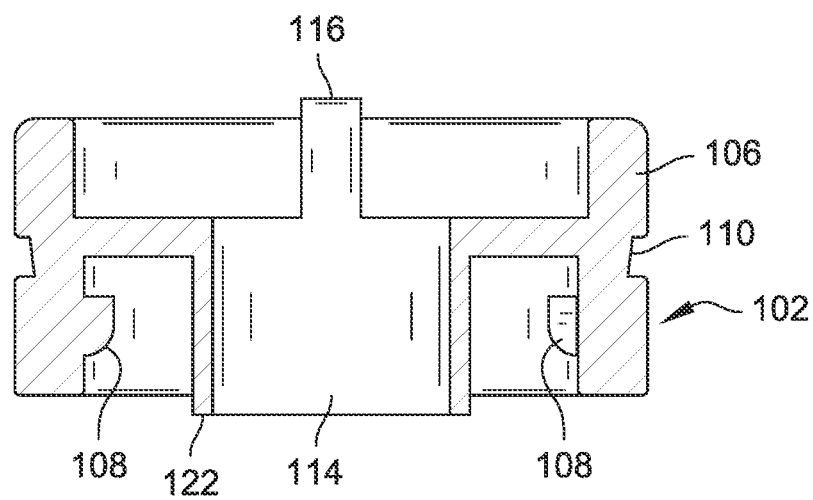
FIG. 12 is another cross-sectional view of a removable oil cap in accordance with embodiments of the present disclosure.

Small engine devices require proper maintenance to ensure adequate operability of the device. Some maintenance procedures are performed when storing the device, while other maintenance procedures occur more regularly. For example, one regular maintenance procedure includes changing the oil of the small engine device. Multiple methods may be used to change the oil. One method may include removing the entire cap and using a siphon pump to remove the oil from the oil fill tube and collect the oil into a container. Using a siphon pump includes downsides, such as, not being able to fully collect all the old oil, and leakage of the oil as it is transferred into a collection pan for disposal. Another method for changing oil includes removal of the entire oil cap and angling the device in a manner to allow the oil to collect into an oil collection pan. This method is physically difficult and dangerous due to having to lift the small engine device. Both methods, however, may lead to oil leaking over the edge of the pan or container causing safety hazards because of slick surfaces. Oil leaks may also lead to environmental degradation due to oil accumulating in the surrounding soil or in water run-off. Spilled oil may present a direct harm to children, pets, or other animals that may contact or ingest the spilled oil. Fines may also be imposed for negative environmental impact.

Referring generally to FIGS. 1 through 14, an oil change cap and system are described. In embodiments, a removable oil cap 100 includes a sidewall 102 and an interior surface 112. The sidewall 102 and/or the interior surface 112 are configured to engage with a motor of a small engine device. The small engine device may include, but is not limited to, a push lawn mower, a yard trimmer, a snow blower, and so forth. It is contemplated that the oil cap 100 may be formed from one or more rigid, durable, and/or heat-resistant materials such as metal, rubber, silicone, plastic (e.g., polyethylene, polycarbonate, polypropylene, polyurethane, etc.), and so forth.

In embodiments, the sidewall 102 includes an inner portion 104 and an outer portion 106 (e.g., as described with reference to FIGS. 1-6). The inner portion 104 can be configured for coupling with an oil receptacle 124 (e.g., as described with reference to FIGS. 13A and 13B) of a motor. For example, the inner portion 104 of the sidewall 102 can include protrusions 108 to connect the removable oil cap 100 to the oil receptacle 124. In a specific embodiment, the protrusions 108 are configured to catch the depression in the opposing connection of the oil receptacle 124 to create a snap fit connection. It is also contemplated that the removable oil cap 100 can be coupled with the oil receptacle 124 by other types of connections (e.g., a threaded engagement or the like).

The outer portion 106 of the sidewall 102 includes a retainer 110 for retaining an oil retention bag 302 (e.g., as described with reference to FIG. 14). In embodiments, the retainer 110 can constitute a channel, a rim, a clip, a notch, a protrusion, or the like for retaining a lip of the oil retention bag 302. In specific embodiments, the retainer 110 is defined by the outer portion 106 of the sidewall 102. For example, the retainer 110 may formed as a channel extending partially into the thickness of the outer portion 106. In such embodiments, the channel is formed with a depth and/or width selected for retaining the lip of the oil retention bag 302. For example, the channels can have a depth of about $\frac{1}{32}^{nd}$ inch to about ½ inch.

In embodiments, the removable oil cap 100 has an interior surface 112 retained within sidewall 102. The interior surface can include an opening 114 extending therethrough. In embodiments, the interior surface 112 defines an upper surface 118 and a lower surface 120 (e.g., as described with reference to FIGS. 1-6). The upper surface 118 can include protrusions (e.g., elongated protrusions 116) on opposing sides of the opening 114 for facilitating insertion and/or removal of the removable oil cap 100 from the oil receptacle 124. In embodiments, the elongated protrusions 116 may be used as grips to loosen or tighten the removable oil cap 100. In some embodiments, the elongated protrusions 116 form a resting portion for the bottom of the removable dipstick 202 (e.g., as described with reference to FIGS. 13A and 13B) and/or for the bottom portion of a removable cover.

In embodiments, the lower surface 120 of the interior surface 112 is configured for engaging with the oil receptacle 124 of the motor. In some embodiments, the lower surface includes a tubular cylindrical fitting 122 for mating with the oil receptacle 124 (e.g., as described with reference to FIGS. 3-4 and 7-12). In some embodiments, the lower surface 120 can include a ring (not shown), for example an O-ring, for facilitating the formation of a seal between the removable oil cap 100 and the oil receptacle 124 to minimize leakage of fluids.

Figure 13A:
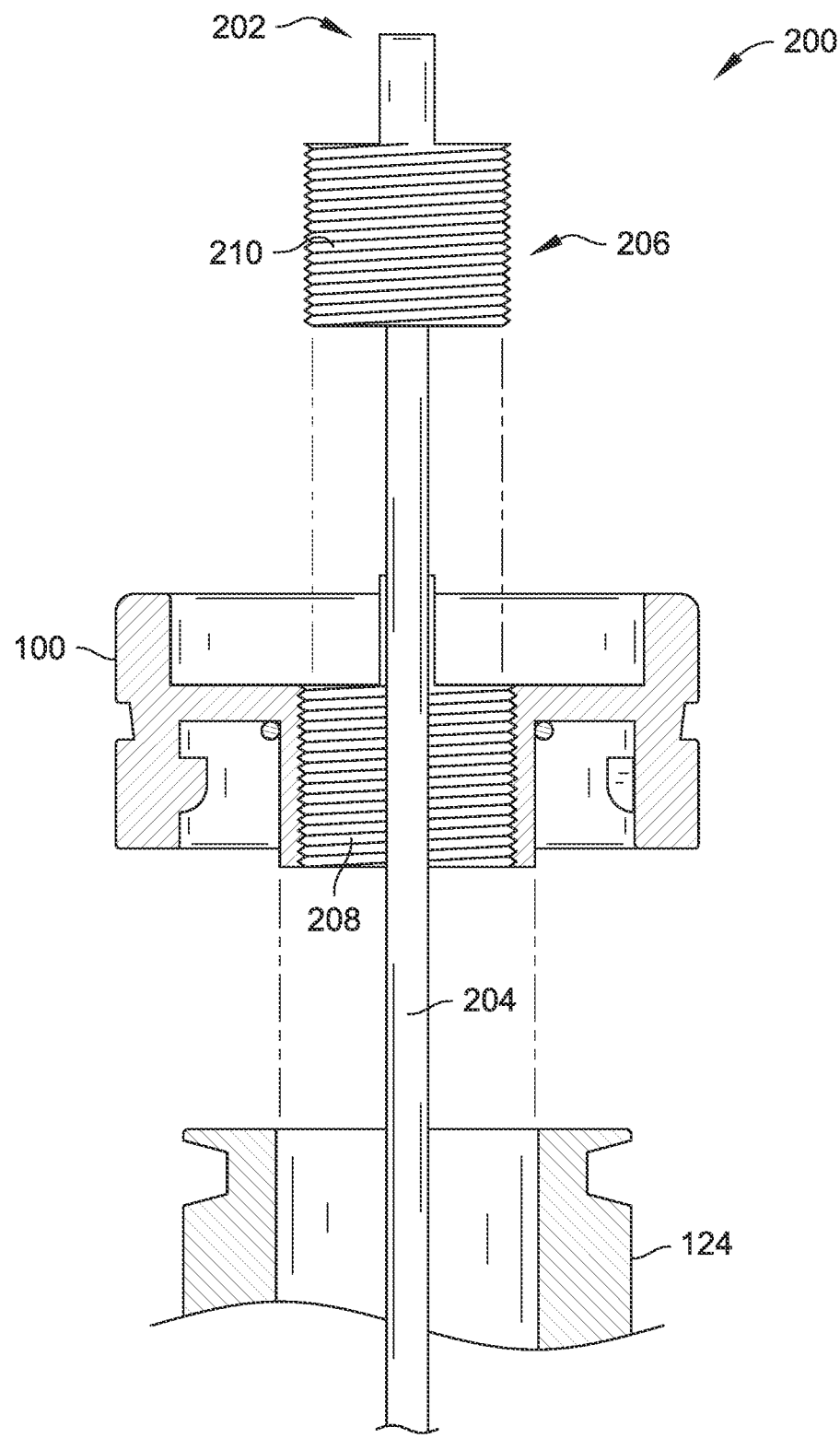
FIG. 13A is a cross-sectional view of a removable oil cap assembly including a removable oil cap, such as the removable oil cap of FIG. 1, and a removable dipstick in accordance with embodiments of the present disclosure.
Figure 13B:
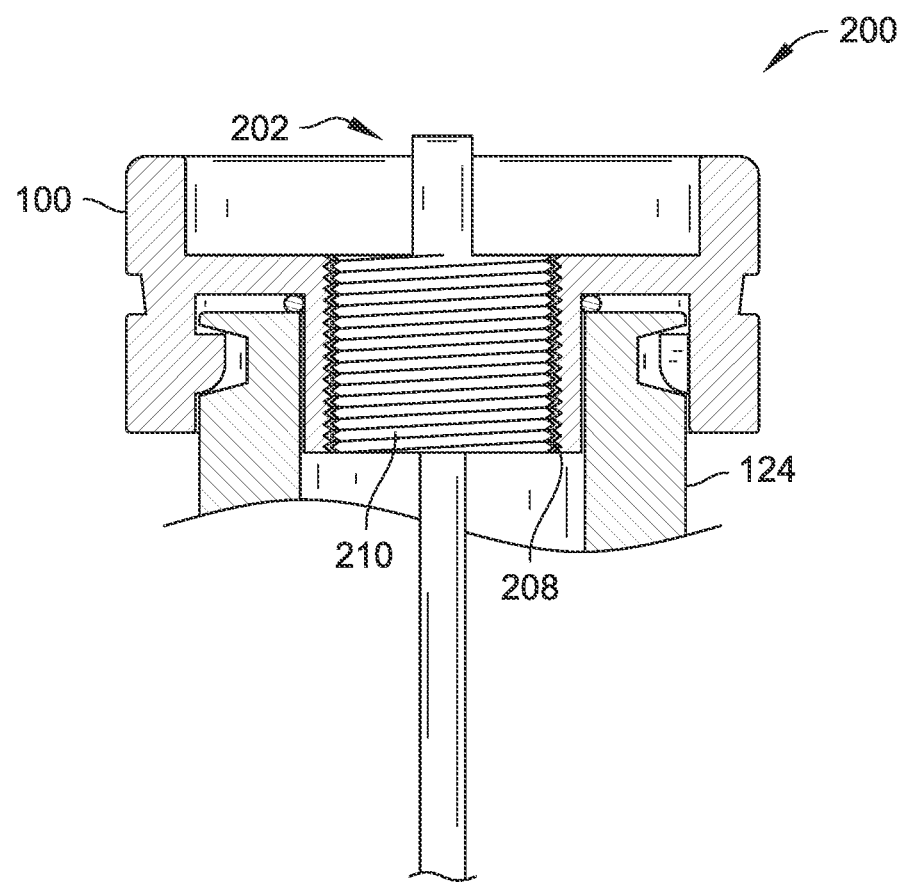
FIG. 13B is another cross-sectional view of a removable oil cap assembly including a removable oil cap, such as the removable oil cap of FIG. 1, and a removable dipstick in accordance with embodiments of the present disclosure.

Referring now to FIGS. 13A and 13B, an oil cap assembly 200 is shown having the removable oil cap 100 coupled with a removable dipstick 202. In embodiments, the removable dipstick 202 includes a dipstick rod 204 and a connector 206. The connector 206 is configured for removably coupling with the removable oil cap 100 to form a secure connection. In some embodiments, the removable dipstick can be configured to couple with the removable oil cap 100 via a threaded engagement. For example, the opening 114 and/or the tubular cylindrical fitting 122 can be formed as an internally threaded female tubular cylindrical fitting 208 configured to receive an externally threaded male cylindrical fitting 210 of the connector 206. It is to be understood that while a threaded engagement is shown in FIGS. 13A and 13B, other types of connections may be utilized, such as a snap fit connection. In embodiments, the dipstick rod 204 is operable to gauge a level of oil retained in the oil receptacle 124 of the motor. For example, the dipstick rod 204 can be formed as an elongated rod configured to extend through the opening 114 of the removable oil cap and into the oil receptacle 124. In some embodiments, the dipstick rod 204 can include marks at the end to indicate a level of the fluid. In embodiments, the dipstick rod 204 can be formed from a flexible material such as metal, fluoroplastic tubing, plastic tubing, other flexible and/or heat resistant materials, combinations of the forgoing materials, and so forth.

Figure 14:
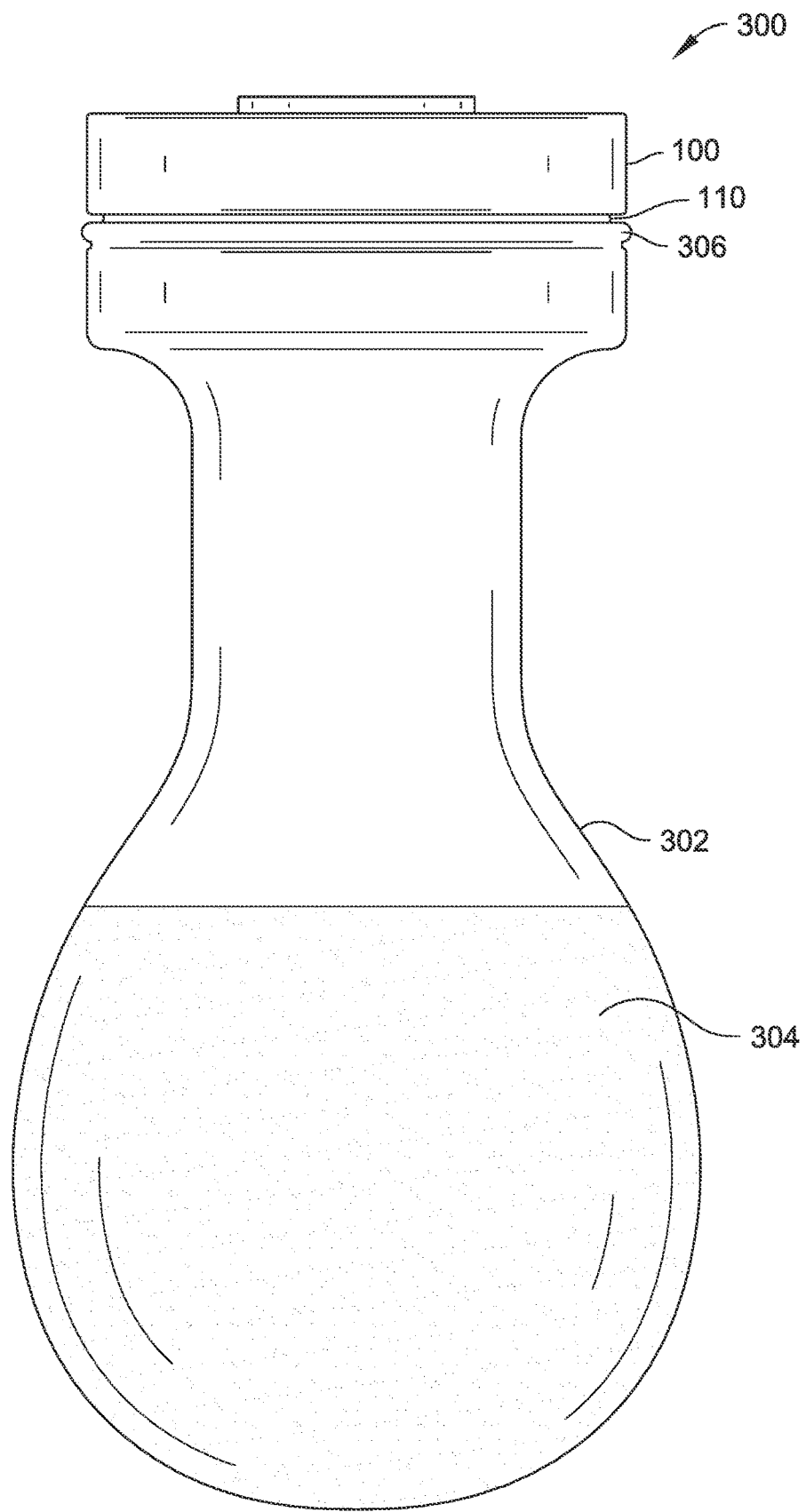
FIG. 14 is a side view of a removable oil cap assembly including a removable oil cap, such as the removable oil cap of FIG. 1, and an oil retention bag in accordance with embodiments of the present disclosure.

Referring now to FIG. 14, an oil cap assembly 300 is shown having the removable oil cap 100 coupled with an oil retention bag 302. In some embodiments, the oil retention bag 302 is formed from a polymer, such as an elastomer. Example elastomers can include, but are not limited to, rubbers, styrene-butadiene block copolymer, ethylene propylene rubber, ethylene propylene diene rubber, silicone elastomers, nitrile rubbers, elastomeric fabrics (e.g., nylon fabric, etc.), combinations of the forgoing materials, and so forth. In a specific embodiment, the oil retention bag 302 is formed from an oil resistant material. In some embodiments, the oil retention bag 302 can be formed from any elastic or expandable material.

As shown, the oil retention bag 302 can include a lip (e.g., elastic lip 306) for removably engaging with the retainer 106 of the removable oil cap 100. The elasticity of the lip 306 and the oil retention bag 302 allows the oil retention bag 302 to seal around the lower portion of the removable oil cap 100. For example, the oil retention bag 302 stretches over the outer portion 106 of sidewall 102 and forms a seal with the retainer 110 to capture the oil 304 flowing from the oil receptacle 124 of the motor. The oil retention bag 302 can expand to receive the quantity of oil 304 deposited therein. In such embodiments, the oil retention bag 302 remains in contact with the oil cap 100 while removing oil 304 from the motor, allowing the oil to be fully retained and minimizing the risk of unintentional oil spillage and/or leaks. Such embodiments thus eliminate the need for an external drip pan or container. The oil retention bag 302 may also be easily removed from the device with one hand. The operator may also easily transport the oil 304 collected in the oil retention bag 302 to a designated used-oil disposal site in accordance with local, state, and federal laws.

It is contemplated that one or more of the removable oil cap 100, the removable dipstick 202, and/or the oil retention bag 302 may be offered individually, or as a system or kit.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. An oil change kit comprising:
   a removable oil cap, the removable oil cap including:
      a sidewall having an inner portion and an outer portion, the outer portion including a channel formed around a circumference of the outer portion; and
      an interior surface having an opening extending therethrough; and
   an oil retention bag, the oil retention bag having a lip configured to engage the channel formed around the circumference of the outer surface of the outer portion of the sidewall of the removable oil cap.

2. The removable oil cap of claim 1, further comprising a removable cover for the opening of the interior surface.

3. The removable oil cap of claim 2, wherein the removable cover couples with the interior surface of the removable oil cap via a threaded engagement.

4. The removable oil cap of claim 1, wherein the interior surface includes one or more elongated protrusions for gripping the removable oil cap to facilitate removal from an oil receptacle of a motor.

5. The removable oil cap of claim 1, wherein a removable dipstick extends through the opening of the interior surface and couples with the opening via a threaded engagement.

6. The removable oil cap of claim 1, wherein the sidewall comprises a circular sidewall and the interior surface forms a circular surface.

7. The removable oil cap of claim 1, wherein the channel partially extends into a thickness of the sidewall.

8. A removable oil cap, comprising:
    an interior surface defining a lower surface and an upper surface, the upper surface having an opening extending therethrough and through the lower surface; and
    a sidewall surrounding the interior surface and having an inner portion and an outer portion, the outer portion including a retainer formed in an outer surface of the outer portion for maintaining a lip of an oil retention bag at least partially within the retainer; the inner portion configured for coupling with an oil receptacle of a motor, wherein the upper surface includes one or more protrusions, wherein at least a portion of the one or more protrusions extend above the sidewall.

9. The removable oil cap of claim 8, wherein the inner portion of the sidewall includes one or more protrusions configured to removably secure to the oil receptacle.

10. The removable oil cap of claim 8, further comprising a removable cover for the opening.

11. The removable oil cap of claim 10, wherein the removable cover couples with the interior surface of the removable oil cap via a threaded engagement.

12. The removable oil cap of claim 8, wherein a removable dipstick extending through the opening of the interior surface and coupling with the opening via a threaded engagement.

13. The removable oil cap of claim 8, wherein the sidewall comprises a circular sidewall and the interior surface forms a circular surface.

14. A removable oil cap system comprising:
    a removable oil cap, the removable oil cap including:
        a sidewall having an inner portion and an outer portion, the outer portion including a channel formed in an outer surface of the outer portion for retaining a lip of an oil retention bag at least partially within the channel; and
        an interior surface having an opening extending therethrough;
    a removable dipstick configured to extend through the opening of the interior surface and into an oil receptacle.

15. The removable oil cap of claim 14, wherein the removable dipstick couples with the opening of the interior surface via a threaded engagement.

16. The removable oil cap of claim 14, wherein the channel partially extends into a thickness of the sidewall.

17. The removable oil cap of claim 14, wherein the upper surface includes one or more protrusions, at least a portion of the one or more protrusions extending above the sidewall.

* * * * *